United States Patent [19]

Hon

[11] Patent Number: 4,798,405
[45] Date of Patent: Jan. 17, 1989

[54] ASSEMBLY FOR ELECTRICALLY NON-CONDUCTIVELY INTERCONNECTING TUBE ENDS

[75] Inventor: Clarence C. Hon, Cherry Hill, N.J.

[73] Assignee: Mobil Oil Corporation, New York, N.Y.

[21] Appl. No.: 99,853

[22] Filed: Sep. 22, 1987

[51] Int. Cl.⁴ .............................................. F16L 19/00
[52] U.S. Cl. ...................................... 285/53; 285/342; 174/85; 361/215
[58] Field of Search ................ 285/53, 342, 423, 369, 285/48, 49, 50, 51, 52, 54, 236, 342, 53, 382.7; 174/85; 361/215

[56] References Cited

U.S. PATENT DOCUMENTS

| Re. 14,077 | 2/1916 | Hall . | |
|---|---|---|---|
| 364,449 | 6/1887 | Story . | |
| 616,578 | 12/1898 | Love . | |
| 906,099 | 12/1908 | Burgess . | |
| 1,246,427 | 11/1917 | Heydon | 285/49 |
| 2,084,761 | 6/1937 | Bradley . | |
| 2,862,732 | 12/1958 | Guillou . | |
| 3,188,122 | 6/1965 | Smith . | |
| 3,288,495 | 11/1966 | Newell et al. | 174/85 X |
| 3,563,576 | 2/1971 | Lee . | |
| 3,705,735 | 12/1972 | Davidson et al. . | |
| 3,747,964 | 7/1973 | Nilsen, Jr. | 285/369 X |
| 3,880,452 | 4/1975 | Fields . | |
| 3,992,043 | 11/1976 | Whitley . | |
| 4,291,903 | 9/1981 | Fields | 285/348 |
| 4,515,397 | 5/1985 | Nowobilski et al. . | |
| 4,529,230 | 7/1985 | Fatula, Jr. . | |
| 4,637,639 | 1/1987 | Jorgensen et al. . | |
| 4,662,660 | 5/1987 | Perea | 285/342 |

FOREIGN PATENT DOCUMENTS

| 8755 | of 1927 | Australia | 285/342 |
|---|---|---|---|
| 104877 | 8/1938 | Australia | 285/53 |
| 537123 | 2/1957 | Canada | 285/342 |
| 1216436 | 4/1960 | France | 285/342 |
| 1260735 | 4/1961 | France | 285/342 |
| 769886 | 3/1957 | United Kingdom | 174/85 |
| 807801 | 1/1959 | United Kingdom | 285/342 |

OTHER PUBLICATIONS

Tec-Line Products-Series 101-Insulated Coupling 2 pages.

Primary Examiner—Thomas F. Callaghan
Attorney, Agent, or Firm—Alexander J. McKillop; Michael G. Gilman; Charles J. Speciale

[57] ABSTRACT

Tube ends are received at opposite ends of a bore passage in a block of an electrically non-conductive material. Ferrules encircling the tube ends are compressed to effect a fluid tight seal of the tube ends and block and effective at pressures of about 650 psi. Plates are mounted to the block ends for applying compression force to the ferrule and the plate mounting involves low reactive force in the block.

6 Claims, 1 Drawing Sheet

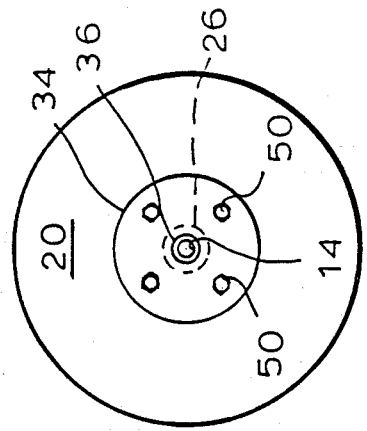
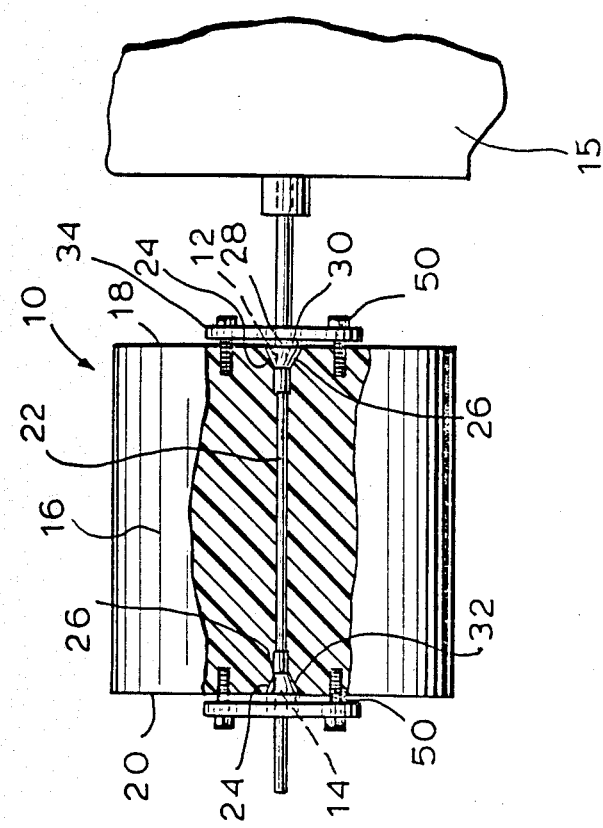

ASSEMBLY FOR ELECTRICALLY NON-CONDUCTIVELY INTERCONNECTING TUBE ENDS

BACKGROUND OF THE INVENTION

Various types of coupling or joining devices are known for joining together the ends of two pipes or tubes and to do so in such manner as to effect a fluid tight joinder thereof. Representative of such types of couplings are U.S. Pat. Nos. 364,449; 616,578; 906,099 and Re. 14,077. Other and varied manners of effecting tube end interconnection are disclosed in U.S. Pat. Nos. 2,084,761; 2,862,732; 3,188,122; 3,563,576; 3,880,452 and 4,529,230 which additionally disclose different ways of employing deformable seal means in such couplings. U.S. Pat. Nos. 3,992,043 and 4,637,639 disclose use of couplings wherein a nut is employed to deform a ferrule about a tube end to obtain a fluid tight joint. U.S. Pat. No. 3,705,735 discloses an electrically insulating joint between two pipe ends.

Most usually such means as exemplified by the aforementioned patents, employ compression members engageable with another component through a screw thread arrangement that requires rotational movement of a closure or compression nut to effect compression of the sealing member in a course extending around the pipe end to deform that sealing member into a fluid tight seal engagement with selected surfaces in the joint assembly. These coupling components invariably have special shapes and thus require special manufacturing and/or machining to produce same. Also, many are of rather complicated construction. Thus the cost and complexity of these types of joining devices is undesirable, if fluid type sealing can be achieved with use of simple, inexpensive standardized readily available components and materials that provide for a tube and joint capable of withstanding joint pressures on the order of 500 to 1,000 psi.

SUMMARY OF THE INVENTION

The present invention relates to a connector assembly for electrically non-conductively interconnecting tube ends in a high pressure fluid flow circuit. In a particularized embodiment, the connector assembly is used for joining tube ends in circuit with a high pressure vessel, such as one that is operating at a pressure on the order of about 650 psi, e.g., a catalyst feed circuit in a polymerization system. As those skilled in the art will readily understand it is possible that conduits and like structures accessing the interior of a polymerization reactor can be sources for the undesirable creation of static electricity presence in the reaction zone particularly where such structures have direct connection to and with electrically powered and/or controlled system devices. Since the presence of static electricity in the reaction zone can interdict ordered and intended polymerization results, it is desirable that non-conductive isolation of the reactor from static electricity promotive devices etc. be maintained. Thus, and for example, a reaction stock material infeed course should at some point include an electrically non-conductive character so that transmission of any static electricity to the reaction zone can be mitigated. It will be understood that while the connector herein described is particularly suited for adaption in connection with a feed supply conduit to a polymerization reactor, it is nonetheless intended for use wherever high pressure flow of fluids are involved and further, it is desired that there be an electrically non-conductive connection between two adjacent tube ends with the mode of connection involving very low reactive loading on the connection.

In accordance with the invention, the ends of two tubes to be connected together are received in a bore opening formed in a block of electrically non-conductive material, for example, a block of Teflon or of phenolic resin or other similarly suitable non-conductive material. The bore in the block has enlarged entrant sections at each of opposite end faces thereof and the tube ends locate within these entrant sections. A ferrule having a tapered outer body portion encircles each tip end and a companion tapered section is formed in the bore entrant sections so that the ferrule if compressed in the axial direction will engage tightly with both the tube end exterior surface and the tapered entrant section surface to form a fluid tight seal effected by compression deformation of the ferrule in the customary manner and with a force applied thereto from externally of the block. The force supplying means desirably is provided in the form of a compression plate mounted on each end face of the block by screw thread fasteners, the block being provided with screw thread passages companion to and receiving the screw fasteners. To uniformly distribute the reactive loading present in the block when the compression plates are moved axially to force the ferrules inwardly in the entrant sections, the mounting is effected with a plurality of screws which distribute this load and the screws preferably are arranged uniformly circularly spaced about the block bore.

In a preferred embodiment, the connector assembly will be employed to connect the end of a tube extending outwardly of a catalyst reactor in a catalytic reaction system wherein a pressure within the vessel will be on the order of 650 psi, to a second tube member. In this embodiment wherein tube ends involved will be ⅛ inch outside diameter stainless steel tubing, the total reactive loading on the screw fasteners at an end face of the block will be substantially 12.3 lbs. while at the same time an absolute fluid tight seal of the connector assembly will be possible.

The invention accordingly comprises the features of construction, combination of elements and arrangement of parts in a connector assembly which will be exemplified in the construction hereinafter set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 1 is a elevational view partly in section showing a connector assembly for electrically non-conductively connecting two tube ends wherein one of the tube ends is in communication with the interior of a high pressure vessel; and FIG. 2 is an end view of the connector assembly as viewed from the left in FIG. 1.

Throughout the following description, like reference numerals are used to denote like parts in the drawings.

DESCRIPTION OF THE PREFERRED EMBODIMENTS

With reference to FIG. 1 the connector assembly shown generally at 10 will be described in a representative form thereof employed for connecting two tube ends 12, 14 wherein one of the tube ends 12 extends from and thus is in communication with the high pressure environment in a catalyst reactor 15, the pressure in the reactor being, for example, on the order of about 600–650 lbs. per square inch. The other tube end 14 to be joined with the first can lead to another system location. A principle requirement of the assembly is that it be electrically non-conductive so that an insulative barrier is situated between the catalytic reactor and the other location or point of use with which the reactor is connected.

The connector assembly includes a block 16 of non-conductive material provided in elongate preferably cylindrical form and having a pair of opposed end faces as at 18 and 20. A through bore shown generally at 22 extends centrally of the block 16 and such through bore has enlarged entrant sections 24 at each end, the bore portion extending between the entrant sections being of substantially uniform diameter and such diameter as generally corresponds with the inside diameter of the two tubes to be assembled therewith. The block 16 will be provided from any one of a number of materials of electrically non-conductive material inclusive of elastomeric materials such as Teflon, materials such as nylon, polyethylene, etc, it being advantageous further that the selected block material be one which is readily machineable for drilling and tapping of same to accept screw thread fasteners as will be described below.

A major advantage of the connector assembly of the invention is that except for simple block drilling and tapping, it requires no specially machined parts and the assembly can be put together with readily available stock items involving no special machine procedures and/or assembly techniques.

The tube ends 12, 14 are received in the enlarged entrant sections 24 of the block, and a stainless steel or brass ferrule 26 of a type such as one manufactured by Crawford Fitting Company under the trademark SWAGELOK can be used. The ferrule 26 as is common with such type component has a conically tapered external surface as at 28 and a cylindrical body part as at 30. The ferrule is received slidably on a tube end before the tube end is inserted in a block entrant section. The tube and ferrule are then inserted in the entrant section which it will be noted has companion tapered surfaces 32 in correspondence to the configuration of the tapered external surface of the ferrule. A compression plate 34 is mounted on each end face 18, 20 of the block 16 and is provided with a central opening 36 through which the tube passes so that the structure of the plate 34 adjacent opening 36 can be brought into engagement with the rear end of the cylindrical portion of the ferrule.

The plate 34 is mounted on the block end faces at a plurality of locations (as best seen in FIG. 2) so that when the plate is moved in a ferrule compressing direction it urges the ferrule tightly into the entrant section of the bore. The reactive force present where the plate is secured to the block thus will be uniformly distributed within the block structure at these plural locations.

The fastening of the plates is achieved through use of screw thread fasteners 50 passing through each plate 34 at preferably uniformly circularly spaced locations, the screw fasteners 50 being received in screw thread passages formed in the block end faces.

When compression is applied to the ferrules, the ferrules which are of deformable material, either metallic or synthetic, will be caused to deform to bring the tapered exterior surface of the ferrule into close tight fitting sealing engagement with the tapered sections 32 in the block and also to deform against the exterior surface of the tube ends. In this manner a fluid type seal capable of resisting joint pressures of about 650 psi and higher is possible.

While there is disclosed above only one embodiment of the connector assembly of the present invention, it would be appreciated that various modifications can be made therein without departing from the scope of the inventive concept disclosed.

What is claimed is:

1. Connector assembly for electrically nonconductively interconnecting electrically conductive tube ends in a high pressure fluid flow circuit, said assembly comprising:

a block of electrically non-conductive material defining an electrically insulative barrier between the electrically conductive tube ends, said block having opposed end faces and a through bore extending between said end faces, said through bore at the ends thereof including enlarged entrant sections for receiving the electrically conductive tube ends, the bore run between the entrant sections being of substantially uniform diameter in correspondence to the inner diameter of the tube ends;

ferrules of a deformable material and having a tapered external body part closely encircling the electrically conductive tube ends, the ferrule tapered body parts being closely fittable with companion tapered surfaces in said bore entrant sections; and force applying means mounted to the block end faces and movably engageable against the ferrules for urging said ferrules axially inwardly in the block entrant sections to compressively deform the ferrules against the electrically conductive tubes and the block companion tapered surfaces and thereby create an electrically non-conducting high pressure resistant fluid seal at the bore entrant sections, said force applying means being mounted to the block end faces at plural individual locations thereon to uniformly distribute at corresponding individual plural locations on said block end faces, the reactive loading applied to the block structure during force application to the ferrules.

2. The connector assembly of claim 1 in which the block is a synthetic material.

3. The connector assembly of claim 2 in which the synthetic material is one of elastomeric material, nylon and a phenolic resin.

4. The connector assembly of claim 1 in which the force applying means mounted to each block end face comprises a plate and fastener means passing through the plate and mounting it to the end face.

5. The connector assembly of claim 4 in which the fastener means comprises screws, there being screw thread passages formed in the block end faces for receiving said screws.

6. The connector assembly of claim 5 in which the tube ends pass centrally through openings in the plates and the fastening screws are uniformly, circularly spaced about said openings.

* * * * *